(12) United States Patent
Joo et al.

(10) Patent No.: US 11,977,928 B2
(45) Date of Patent: May 7, 2024

(54) APPARATUS AND METHOD FOR PERFORMING A RECOGNITION OPERATION IN A NEURAL NETWORK

(71) Applicant: Samsung Electronics Co., Ltd., Suwon-si (KR)

(72) Inventors: Deokjin Joo, Seongnam-si (KR); Namjoon Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 681 days.

(21) Appl. No.: 16/454,128

(22) Filed: Jun. 27, 2019

(65) Prior Publication Data
US 2020/0192726 A1 Jun. 18, 2020

(30) Foreign Application Priority Data

Dec. 12, 2018 (KR) .................. 10-2018-0160341

(51) Int. Cl.
*G06F 9/50* (2006.01)
*G06N 3/04* (2023.01)

(52) U.S. Cl.
CPC .......... *G06F 9/5083* (2013.01); *G06F 9/5027* (2013.01); *G06N 3/04* (2013.01)

(58) Field of Classification Search
CPC ........ G06F 9/5083; G06F 9/5027; G06N 3/04
See application file for complete search history.

(56) References Cited

U.S. PATENT DOCUMENTS 5,532,938 A 7/1996 Kondo et al.
11,599,791 B2 * 3/2023 Miyauchi ............... G06N 3/045
(Continued)

FOREIGN PATENT DOCUMENTS

EP  3 396 624 A1  10/2018
KR  10-2006-0016947 A  2/2006
(Continued)

OTHER PUBLICATIONS

Mazumdar et al. "Object recognition in videos by sequential frame extraction using convolutional neural networks and fully connected neural networks." 2017 International conference on energy, communication, data analytics and soft computing (ICECDS). IEEE, pp. 1485-1488. (Year: 2017).*

(Continued)

*Primary Examiner* — Michael W Ayers
*Assistant Examiner* — Willy W Huaracha
(74) *Attorney, Agent, or Firm* — NSIP Law

(57) ABSTRACT

A method of performing an operation in a neural network apparatus may include acquiring operation groups each comprising at least one input feature map and at least one kernel, and tag information corresponding to each of the operation groups, determining an operating unit in an idle state from among operating units, performing, at the operating unit in the idle state, a convolution operation between an input feature map and a kernel included in a operation group from among the operation groups to create an intermediate feature map, determining, based on tag information corresponding to the operation group, a post-processing unit from among post-processing units, and creating, at the post-processing unit, an output feature map using the intermediate feature map.

20 Claims, 13 Drawing Sheets

(56) References Cited

U.S. PATENT DOCUMENTS

| | | | |
|---|---|---|---|
| 11,783,167 B1* | 10/2023 | Ko | G06N 3/04 |
| | | | 706/43 |
| 2002/0163881 A1* | 11/2002 | Dhong | G06F 11/2007 |
| | | | 370/225 |
| 2008/0219734 A1* | 9/2008 | Seto | G03G 15/6576 |
| | | | 399/406 |
| 2012/0291041 A1* | 11/2012 | Cipar | G06F 9/5011 |
| | | | 718/104 |
| 2014/0149717 A1* | 5/2014 | Sprangle | G06F 9/30036 |
| | | | 712/205 |
| 2015/0317169 A1* | 11/2015 | Sinha | H04L 61/2076 |
| | | | 713/2 |
| 2016/0321784 A1* | 11/2016 | Annapureddy | G06N 3/082 |
| 2018/0046914 A1 | 2/2018 | Li et al. | |
| 2018/0046916 A1 | 2/2018 | Dally et al. | |
| 2018/0082181 A1 | 3/2018 | Brothers et al. | |
| 2018/0164866 A1 | 6/2018 | Turakhia et al. | |
| 2018/0189056 A1 | 7/2018 | Turakhia et al. | |
| 2019/0065934 A1 | 2/2019 | Liu et al. | |
| 2019/0361674 A1 | 11/2019 | Fais et al. | |
| 2021/0200993 A1* | 7/2021 | Chen | G06K 9/6232 |

FOREIGN PATENT DOCUMENTS

| | | |
|---|---|---|
| KR | 10-2017-0128080 A | 11/2017 |
| WO | WO 2017/185387 A1 | 11/2017 |

OTHER PUBLICATIONS

Kang et al. "Partially connected feedforward neural networks structured by input types." IEEE transactions on neural networks 16.1 pp. 175-184. (Year: 2005).*

Lee, Jinmook et al., "A 21mW Low-power Recurrent Neural Network Accelerator with Quantization Tables for Embedded Deep Learning Applications", *2017 IEEE Asian Solid-State Circuits Conference (A-SSCC)*, Seoul, Korea, Nov. 6-8, 2017 (pp. 237-240).

Delmas, Alberto, et al. "Bit-tactical: Exploiting Ineffectual Computations in Convolutional Neural Networks: Which, Why, and How", *arXiv preprint arXiv:1803.03688*, Mar. 9, 2018 (pp. 1-14).

* cited by examiner

FIG. 7

APPARATUS AND METHOD FOR PERFORMING A RECOGNITION OPERATION IN A NEURAL NETWORK

CROSS-REFERENCE TO RELATED APPLICATION

This application claims the benefit under 35 USC § 119(a) of Korean Patent Application No. 10-2018-0160341, filed on Dec. 12, 2018, in the Korean Intellectual Property Office, the entire disclosure of which is incorporated herein by reference for all purposes.

BACKGROUND

1. Field

The following description relates to a method and apparatus for load balancing in a neural network.

2. Description of Related Art

Neural networks are specialized computational architecture, which after substantial training may provide computationally intuitive mappings between input patterns and output patterns. Along with the development of neural network technology, various kinds of electronic systems have been developed that use a neural network to analyze input data to extract valid data.

Recently, hardware has been developed to accelerator the use of a Deep Neural Network (DNN) efficiently with low power. However, apparatuses for processing the neural network require a large amount of computations for complex input data.

Particularly, in devices implemented with low power and low performance, technology for efficiently processing operations for a neural network is needed in order to analyze a large amount of input data in real time to extract desired information using the neural network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of performing an operation in a neural network apparatus, the method including acquiring operation groups each comprising at least one input feature map and at least one kernel, and tag information corresponding to each of the operation groups, determining an operating unit in an idle state from among operating units, performing, at the operating unit in the idle state, a convolution operation between an input feature map and a kernel included in a operation group from among the operation groups to create an intermediate feature map, determining, based on tag information corresponding to the operation group, a post-processing unit from among post-processing units, and creating, at the post-processing unit, an output feature map using the intermediate feature map.

The determining of the operating unit in the idle state may include determining queue units to receive the operation groups and the tag information, receiving, at a load balancing unit, a signal that a workload is to be processed from the queue units, and a signal representing that the operating unit is in the idle state from the operating unit, matching, at a load balancing unit, the queue units with the operating unit in the idle state, and transferring the operation groups and the tag information from the queue units to the operating unit in the idle state.

The operating units are connected to the post-processing units by a connecting unit, and the determining of the post-processing unit further may include receiving, at a connecting unit, the intermediate feature map and tag information mapped to the operation group from the operating units, and transferring, at the connecting unit, the intermediate feature map to the post-processing unit based on the tag information.

The creating of the output feature map may include determining, at the post-processing unit, a partial sum of the intermediate feature map to create the output feature map.

The creating of the output feature map may include performing, at the post-processing unit, at least one of pooling or an activation function operation using the intermediate feature map to create the output feature map.

The queue units may be connected to some of the operating units by a fully-connected method, and some of the operating units may be connected to some of the post-processing units by a fully-connected method.

The operating units may include multiply and accumulate (MAC) units.

The load balancing unit may include an arbiter.

The connecting unit may include at least one of a multiplexer or a bus.

In another general aspect, there is provided a neural network apparatus for performing an operation, the neural network apparatus including a processor configured to acquire operation groups each comprising at least one input feature map and at least one kernel, and tag information corresponding to each of the operation groups, determine an operating unit in an idle state from among operating units, control the operating unit in the idle state to perform a convolution operation between an input feature map and a kernel included in a operation group from among the operation groups to create an intermediate feature map, determine, based on tag information corresponding to the operation group, a post-processing unit from among post-processing units, and control the post-processing unit to create an output feature map using the intermediate feature map.

The processor may be configured to determine queue units to receive the tag information and the operation groups, control a load balancing unit to receive a signal that a workload is to be processed from the queue units, to receive a signal representing that the operating unit is in the idle state from the operating unit, and to match the queue units with the operating unit in the idle state, and control the queue units to transfer the operation groups and the tag information to the operating unit in the idle state.

The operating units may be connected to the post-processing units by a connecting unit, and the processor may be configured to control the connecting unit to receive the intermediate feature map and tag information mapped to the operation group from the operating units, and to transfer the intermediate feature map to the post-processing unit based on the tag information.

The processor may be configured to control the post-processing unit to determine a partial sum of the intermediate feature map to create the output feature map.

The processor may be configured to control the post-processing unit to perform at least one of pooling or an activation function operation using the intermediate feature map to create the output feature map.

Some of the queue units may be connected to some of the operating units by a fully-connected method, and some of the operating units may be connected to some of the post-processing units by a fully-connected method.

The operating units may include multiply and accumulate (MAC) units.

The load balancing unit may include an arbiter.

The connecting unit may include at least one of a multiplexer or a bus.

The apparatus may include a memory storing instructions that, when executed, configures the processor to acquire the operation groups, to determine the operating unit in the idle state, to control the operating unit in the idle state, to determine the post-processing unit, and to control the post-processing unit to create the output feature map.

Other features and aspects will be apparent from the following detailed description, the drawings, and the claims.

BRIEF DESCRIPTION OF DRAWINGS

FIG. 7 is a diagram illustrating an example of creating output feature maps as the results of convolution operations between input feature maps and kernels.

Figure 1:
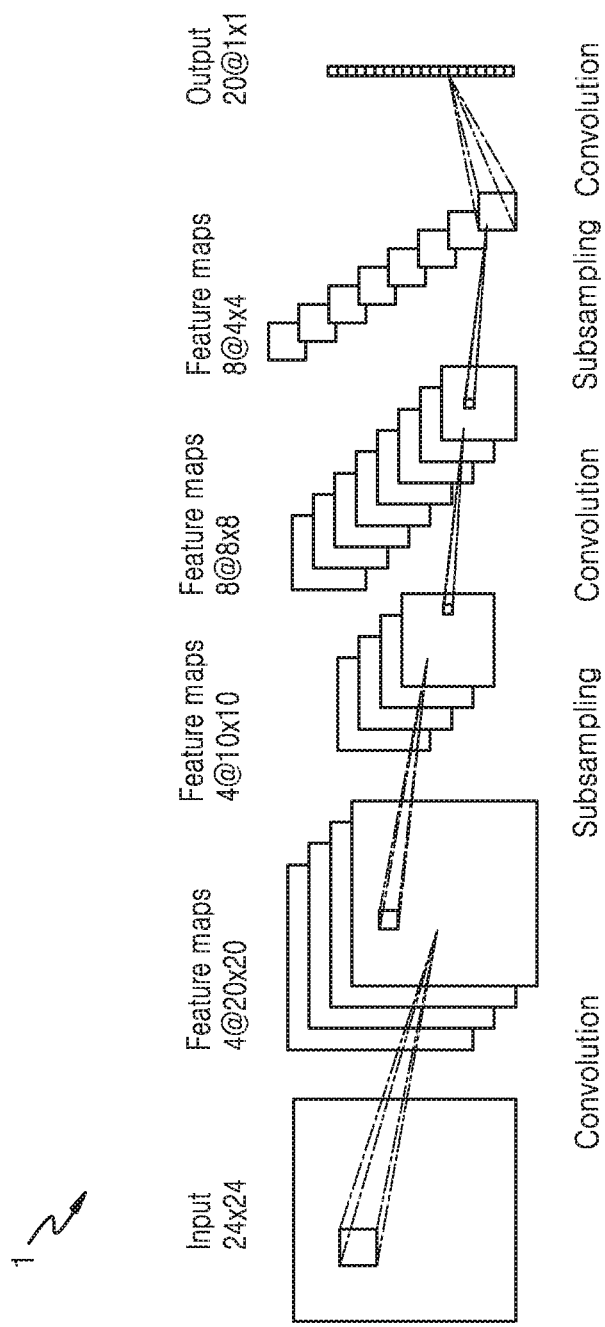
FIG. 1 is a diagram illustrating an example of an architecture of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, expressions, for example, "between" and "immediately between," and "adjacent to" and "immediately adjacent to" may also be construed as described in the foregoing. As used herein, the term "and/or" includes any one and any combination of any two or more of the associated listed items.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. The expression "at least one of a, b or c" indicates only a, only b, only c, both a and b, both a and c, both b and c, all of a, b, and c, or variations thereof. The use of the term 'may' herein with respect to an example or embodiment, e.g., as to what an example or embodiment may include or implement, means that at least one example or embodiment exists where such a feature is included or implemented while all examples and embodiments are not limited thereto.

Hereinafter, the disclosure will be described in detail with reference to the accompanying drawings.

FIG. 1 is a diagram illustrating an example of an architecture of a neural network.

Referring to FIG. 1, a neural network 1 may be an architecture of a Deep Neural Network (DNN) or n-layer neural networks. The DNN or the n-layer neural networks may correspond to neural networks such as, for example, Convolutional Neural Networks (CNNs), Recurrent Neural Networks (RNNs), Deep Belief Networks (DBNs), Restricted Boltzmann Machines (RBMs), fully-connected network (FCN), a deep convolutional network (DCN), a long-short term memory (LSTM) network, and a grated recurrent units (GRUs). For example, the neural network 1 may be a CNN, although not limited thereto. In FIG. 1, a CNN corresponding to an example of the neural network 1 may further include a sub-sampling layer (or called a pooling layer) and a fully connected layer, in addition to a convolution layer.

The neural network 1 may be implemented as an architecture having a plurality of layers including an input image, feature maps, and an output. In the neural network 1, the input image may be convoluted with a filter called weights, and as a result, a plurality of feature maps may be output. The output feature maps may be again convoluted as input feature maps with the weights, and a plurality of new feature maps may be output. After the convolution operations are repeatedly performed, the recognition results of features of the input image through the neural network 1 may be finally output.

For example, when an image of a 24×24 pixel size is input to the neural network 1 of FIG. 1, the input image may be output as feature maps of 4 channels each having a 20×20 size through a convolution operation with weights. Also, some of the pixel values of the feature maps of 4 channels each having the 20×20 size may be subject to a sub-sampling operation, such as, for example, max-pooling and average-pooling, to output feature maps of 4 channels each having a 10×10 size.

In an example, the 10×10 feature maps may be repeatedly subject to convolution operations and sub-sampling operations with weights so that the sizes of the 10×10 feature maps may be reduced and global features may be output. The neural network 1 may repeatedly perform convolution operations and sub-sampling (or pooling) operations on the several layers to filter robust features, i.e., global features that are capable of representing the input image from the input image, to output the global features, and to input the global features to the fully connected layer, thereby recognizing the input image.

In another example, the neural network may receive an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be output through the neural network.

Figure 2:
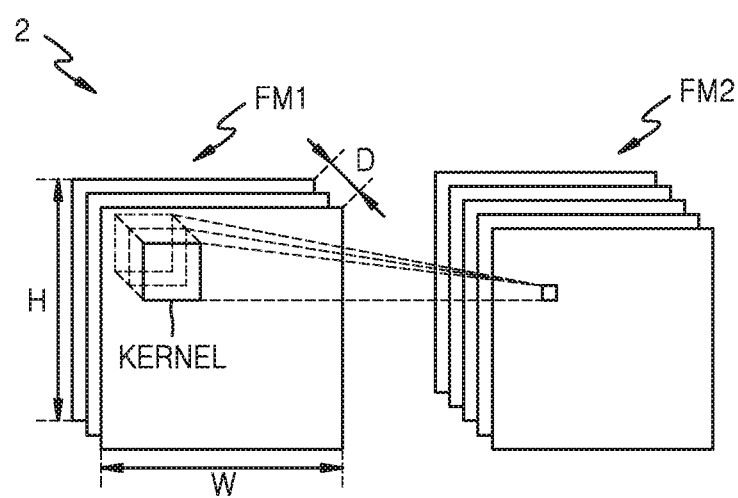
FIG. 2 is a diagram illustrating an example of a relation between an input feature map and an output feature map in a neural network.

FIG. 2 is a diagram illustrating an example of a relation between an input feature map and an output feature map in a neural network.

Referring to FIG. 2, in an example, in a certain layer 2 of a neural network, a first feature map FM1 may correspond to an input feature map and a second feature map FM2 may correspond to an output feature map. A feature map may mean a data set representing various features of input data. The first and second feature maps FM1 and FM2 may have elements of a 2-Dimensional (2D) matrix or elements of a 3-Dimensional (3D) matrix, wherein each element defines a pixel value. The first and second feature maps FM1 and FM2 may have a width (or called a column) W, a height (or called a row) H, and a depth D, wherein the depth D may correspond to the number of channels.

The first feature map FM1 may be convoluted with kernels to create the second feature map FM2. The kernels may be defined for individual elements and convoluted with the first feature map FM1 to filter features of the first feature map FM1. The kernels may be respectively convoluted with windows, also called tiles, of the first feature map FM1, while shifting on the first feature map FM1 by a sliding window method. During each shifting, pixel values of the kernels may be respectively multiplied by and added to pixel values of windows overlapping with the kernels in the first feature map FM1. As the first feature map FM1 is convoluted with the kernels, a channel of the second feature map FM2 may be created. In FIG. 1, a single kernel is shown. However, a plurality of kernels may be convoluted with the first feature map FM1 to create the second feature map FM2 of a plurality of channels.

Meanwhile, the second feature map FM2 may correspond to an input feature map of the next layer. For example, the second feature map FM2 may become an input feature map of a pooling (or sub-sampling) layer.

In FIGS. 1 and 2, for convenience of description, a schematic architecture of the neural network 1 is shown. However, the neural network 1 may be implemented with a larger or smaller number of layers, feature maps, kernels, etc., than those shown in FIGS. 1 and 2, and sizes of the layers, feature maps, weights, etc. may also be modified variously.

Figure 3:
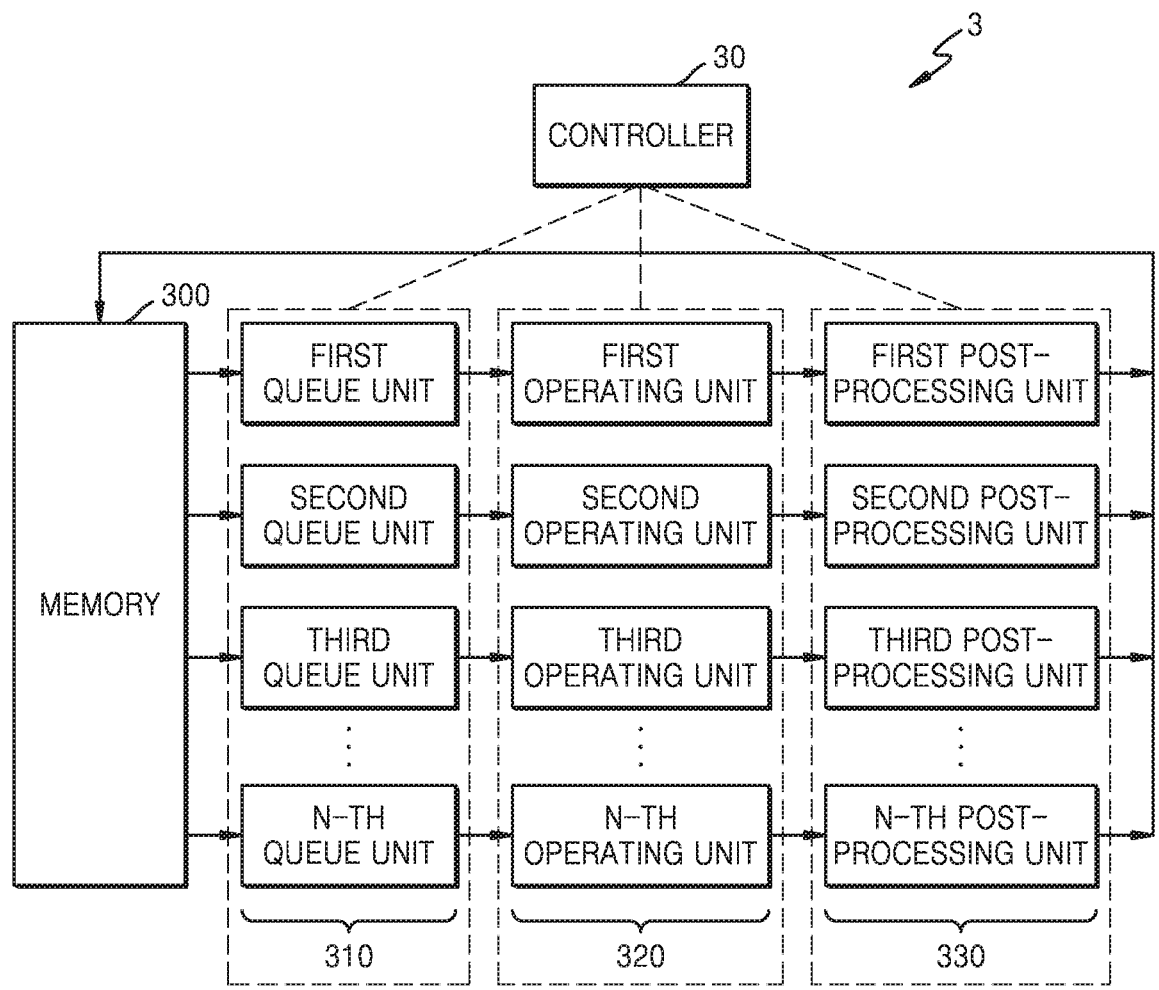
FIG. 3 is a diagram illustrating examples of devices used to perform operations in a neural network apparatus.

FIG. 3 is a diagram illustrating examples of devices used to perform operations in a neural network apparatus.

Referring to FIG. 3, a neural network apparatus 3 may include a controller 30, a memory 300, queue units 310, operating units 320, and post-processing units 330.

The controller 30 may control all operations for driving the neural network apparatus 3.

For example, the controller 30 may execute programs stored in the memory 300 of the neural network apparatus 3 to control all operations of the neural network apparatus 3. The controller 30 includes at least one of the apparatuses described with reference to FIGS. 3-6 and 8-10 or performs at least one of the methods described with reference to FIGS. 1-11. The controller 30 refers to a data processing device configured as hardware with a circuitry in a physical structure to execute desired operations. For example, the desired operations may include codes or instructions included in a program. For example, the controller 30 may be implemented as a microprocessor, a processor core, a multicore processor, a multiprocessor, a central processing unit (CPU), a graphics processing unit (GPU), an application processor (AP), an application-specific integrated circuit (ASIC), and a field programmable gate array (FPGA) included in the neural network apparatus 3, although not limited thereto. Also, the controller 30 may execute programs stored in the controller 30 to control all operations of the neural network apparatus 3. For example, the controller 30 may be implemented as a microprocessor (MCU) in which a CPU, a memory (Read Only Memory (ROM) or Radom Access Memory (RAM)), etc. are installed in a single chip, although not limited thereto. Further details regarding the controller 30 is provided below.

According to an embodiment of the disclosure, the controller 30 may control the memory 300, the queue units 310, the operating units 320, and the plurality of post-processing units 330.

The memory 300 may be hardware storing various data that is processed on the neural network apparatus 3, and for example, the memory 300 may store data processed on the neural network apparatus 3 and data that is to be processed on the neural network apparatus 3. Also, the memory 300 may store applications that are to be driven by the neural network apparatus 3, drivers, etc. The memory 300 may include a mass storage medium, such as, for example, random access memory (RAM) (for example, dynamic random access memory (DRAM) or static random access memory (SRAM)), read-only memory (ROM), electrically erasable programmable read-only memory (EEPROM), compact disc-read only memory (CD-ROM), Blue-ray or another optical disk storage, a hard disk drive (HDD), a solid state drive (SSD), or a flash memory. Further details regarding the memory 300 is provided below.

The controller 30 may read/write neural network data, for example, image data, voice data, feature map data, weight data, etc. from/in the memory 300, and execute the neural network using the read/written data.

When the neural network is executed, the controller 30 may repeatedly perform convolution operations between an input feature map and weights to create data for an output feature map. In an example, an operation count of the convolution operations may be determined depending on various factors, such as, for example, the number of channels of the input feature map, the number of channels of the weights, a size of the input feature map, a size of the weights, and precisions of values.

An input feature map that is input to the neural network may be output as an output feature map through operations that use the queue units 310, the operating units 320, and the post-processing units 330 may be used.

Referring to FIG. 3, the neural network apparatus 3 may include the queue units 310. The queue units 310 may receive various operands from the memory 300. The queue units 310 may receive operands, such as an input feature map and a kernel, from the memory 300.

In an example, each of the queue units 310 may receive an operation group including at least one input feature map and at least one kernel from the memory 300. The operation group may include at least one input feature map and at least one kernel that are used to create an output feature map.

The number of input feature maps included in an operation group may be determined depending on the number of input channels. For example, when input channels are RGB channels, an operation group may include three input feature maps respectively corresponding to an R channel, a G channel, and a B channel.

Also, the number of kernels included in the operation group may be determined depending on the number of input channels. For example, when the number of input channels is three, an operation group may include three kernels respectively corresponding to three input feature maps.

In an example, when a plurality of kinds of kernels are applied to an input feature map, each operation group including the input feature map may include different kinds of kernels. For example, the kinds of kernels may include an edge detection kernel, a sharpen kernel, a Gaussian blur kernel, etc., and at least one kernel that is included in an operation group may be determined depending on the kind of the kernel. Meanwhile, the kinds of kernels are not limited to the above-mentioned kinds of kernels.

Referring to FIG. 3, in an example, the queue units 310 may be one-to-one connected to the operating units 320, respectively.

In an example, the controller 30 may determine whether a first operating unit connected to a first queue unit is in an idle state. The first operating unit may be in an operating state in which an operation is being performed, or in an idle state in which no operation is being performed.

When the first operating unit is in the idle state, the first queue unit may transfer an input feature map and a kernel to the first operating unit. In an example, the first queue unit may transfer an input feature map included in an operation group and a kernel corresponding to the input feature map to the first operating unit. In an example, when the first operating unit terminates an operation, the first queue unit may transfer another input feature map included in the operation group and a kernel corresponding to the other input feature map to the first operating unit. That is, the first queue unit may transfer input feature maps and kernels corresponding to the input feature maps sequentially to the first operating unit.

Likewise, second through N-th queue units may transfer at least one input feature map and at least one kernel included in an operation group received from the memory 300 to second through N-th operating units, respectively.

Meanwhile, referring to FIG. 3, the queue units 310 may be one-to-one connected to the operating units 320, respectively, so that each of the queue units 310 may transfer an operation group to the corresponding one of the operating units 320. For example, the first queue unit may transfer an operation group to the first operating unit, without transferring the operation group to the other operating units included in the operating units.

In the operating units 320, convolution operations between input feature maps and kernels received from the queue units 310 may be performed. As the result of the operations between the input feature maps and the kernels in the operating units 320, an intermediate feature map may be created.

The operating units 320 may be one-to-one connected to the post-processing units 330, respectively, so that each of the operating units 320 transfers the intermediate feature map to the corresponding one of the post-processing units 330. For example, the first operating unit may transfer an intermediate feature map to the first post-processing unit, without transferring the intermediate feature map to the other post-processing units included in the post-processing units 330.

The post-processing units 330 may perform post-processing on the intermediate feature maps received from the operating units 320. For example, the post-processing units 330 may perform pooling or an activation function operation on the intermediate feature maps to create an output feature map. The activation function may be a function such as, for example, ReLu function, a Sigmoid function, and a Softmax function.

A plurality of output feature maps created by the post-processing units 330 may be stored in the memory 300. The output feature maps stored in the memory 300 may be used as input feature maps, or the controller 30 may make a determination based on the output feature maps.

Meanwhile, a count of the number of convolution operations that are performed by the operating units 320 may be determined according to various factors, such as, for example, the size of an input feature map, the size of a kernel, and a kind of a kernel. For example, the operation count may be determined according to a proportion of 0 (zero) included in a kernel.

Accordingly, some of the operating units 320 may complete operations earlier than the other operating units 320. However, when the queue units 310, the operating units 320, and the post-processing units 330 are one-to-one connected to each other, as shown in FIG. 3, some operating units that have completed operations earlier than the other operating units may receive no operation group from queue units connected thereto although the operating units enter an idle state.

For example, the first operating unit may complete an operation earlier than the second operating unit. In this case, when the first operating unit is connected only to the first queue unit, as shown in FIG. 3, the first operating unit may receive no operation group from the second queue unit although the first operating unit enters an idle state.

Figure 4:
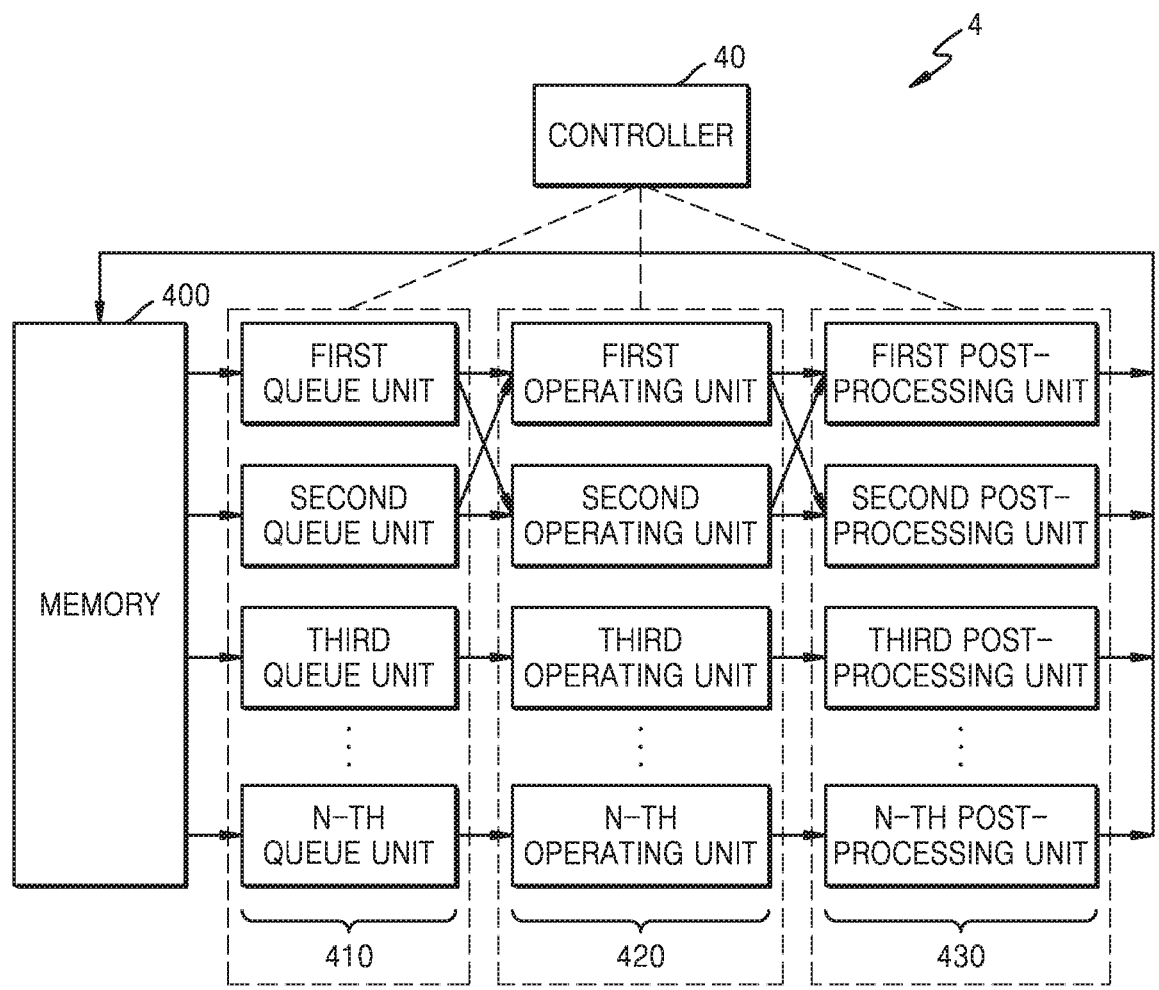
FIG. 4 is a diagram illustrating examples of devices used to perform operations in a neural network apparatus.

FIG. 4 is a diagram illustrating examples of devices used to perform operations in a neural network apparatus.

Referring to FIG. 4, a neural network apparatus 4 may include a controller 40, a memory 400, a plurality of queue units 410, a plurality of operating units 420, and a plurality of post-processing units 430.

In addition to the description of FIG. 4 below, the descriptions of FIGS. 1-3 are also applicable to FIG. 4, and are incorporated herein by reference. Thus, the above description may not be repeated for convenience of description.

In an example, at least some of the queue units 410 may be connected to at least some of the operating units 420 by a fully-connected method. Referring to FIG. 4, a first queue unit and a second queue unit may be connected to a first operating unit and a second operating unit by a 2:2 fully-connected method.

The controller 40 may determine whether the first operating unit and the second operating unit connected to the first queue unit are in an idle state. When the first operating unit is in an idle state, the first queue unit may transfer an input feature map and a kernel to the first operating unit. In an example, when the first operating unit is performing an operation and the second operating unit is in an idle state, the first queue unit may transfer an input feature map and a kernel to the second operating unit. Also, when the first operating unit is performing an operation, an operation for an operation group of the second queue unit has been completed, and the second operating unit is in an idle state, the first queue unit may transfer an input feature map and a kernel to the second operating unit.

In an example, the controller 40 may determine whether the first operating unit and the second operating unit connected to the second queue unit are in an idle state. When the second operating unit is in an idle state, the second queue unit may transfer an input feature map and a kernel to the second operating unit. Also, when the second operating unit is performing an operation and the first operating unit is in an idle state, the second queue unit may transfer an input feature map and a kernel to the first operating unit. Also, when the second operating unit is performing an operation, an operation of an operation group of the first queue unit has been completed, and when the first operating unit is in an idle state, the second queue unit may transfer an input feature map and a kernel to the first operating unit.

Meanwhile, referring to FIG. 4, the third to N-th queue units may be one-to-one connected to the third to N-th operating units. Each of the third to N-th queue units may transfer an operation group only to the corresponding one of the third to N-th operating units.

In an example, some of the operating units 420 may be connected to some of the post-processing units 430 by a fully-connected method. Referring to FIG. 4, the first operating unit and the second operating unit may be connected to the first post-processing unit and the second post-processing unit by a 2:2 fully-connected method.

In an example, the result of an operation between at least one input feature map and at least one kernel included in the operation group of the first queue unit is transferred to a post-processing unit corresponding to the first queue unit. For this, when the first queue unit transfers an input feature map and a kernel to the first operating unit or the second operating unit, the first queue unit may transfer tag information to the first operating unit or the second operating unit, together with the input feature map and the kernel. The tag information may include information about a position of a post-processing unit to which an intermediate feature map as the result of an operation between the input feature map and the kernel is to be transferred. For example, tag information that is transferred from the first queue unit to the first operating unit or the second operating unit may include information about a position of the first post-processing unit.

The controller 40 may determine which one of the first post-processing unit and the second post-processing unit the intermediate feature map created by the first operating unit is transferred to. Based on the tag information acquired from the first operating unit, the controller 40 transfers the intermediate feature map to the first post-processing unit or the second post-processing unit.

For example, when an intermediate feature map created by the first operating unit is the result of an operation between an input feature map and a kernel transferred from the first queue unit, tag information about a position of the first post-processing unit, transferred from the first queue unit, may exist in the first operating unit. The controller 40 may transfer the intermediate feature map created by the first operating unit to the first post-processing unit based on the tag information. Likewise, when an intermediate feature map created by the first operating unit is the result of an operation between an input feature map and a kernel transferred from the second queue unit, the first operating unit may transfer the intermediate feature map to the second post-processing unit based on the tag information transferred from the second queue unit.

An operation count of convolution operations that are performed by the operating units 420 may be determined according to various factors, such as, for example, the size of an input feature map, the size of a kernel, and a kind of a kernel. Accordingly, some of the operating units 420 may complete an operation earlier than the other operating units 420.

For example, when the first operating unit completes an operation for the first queue unit, an input feature map and a kernel that have not yet been operated may remain in the second queue unit. In this case, the controller 40 may transfer the input feature map and the kernel remaining in the second queue unit to the first operating unit because the first queue unit and the second queue unit are connected to the first operating unit and the second operating unit by the fully-connected method, as shown in FIG. 4. Because at least some of the queue units 410 included in the neural network apparatus 4 are connected to at least some of the operating units 420 by the fully-connected method, the number of operating units 420 that are in an idle state may be reduced, thereby achieving load balancing. Also, latency that is caused when convolution operations are performed may be reduced.

Meanwhile, in the operating units 420, matrix multiplication operations may be performed on a fully-connected layer, although the kinds of operations that are performed in the operating units 420 are not limited thereto.

Because at least some of the queue units 410 are connected to at least some of the operating units 420 by the fully-connected method, a plurality of input feature maps and a plurality of kernels included in a queue unit may be transferred to different operating units. However, a plurality of intermediate feature maps created from the input feature maps and the kernels included in the queue unit may be sent at a post-processing unit corresponding to the queue unit. For this, when the input feature maps and the kernels included in the queue unit are transferred to different operating units, the queue unit may transfer tag information including information about a position of a post-processing unit corresponding to the queue unit to the different operating units, together with the input feature maps and the kernels.

For example, an input feature map and a kernel included in the first queue unit may be transferred to the first operating unit or the second operating unit. When the first queue unit transfers the input feature map and the kernel to the first operating unit or the second operating unit, the first queue unit may transfer tag information including information about a position of the first post-processing unit to the first operating unit or the second operating unit, together with the input feature map and the kernel, so that an intermediate feature map created by the first operating unit or the second operating unit arrives at the first post-processing unit.

Figure 5A:
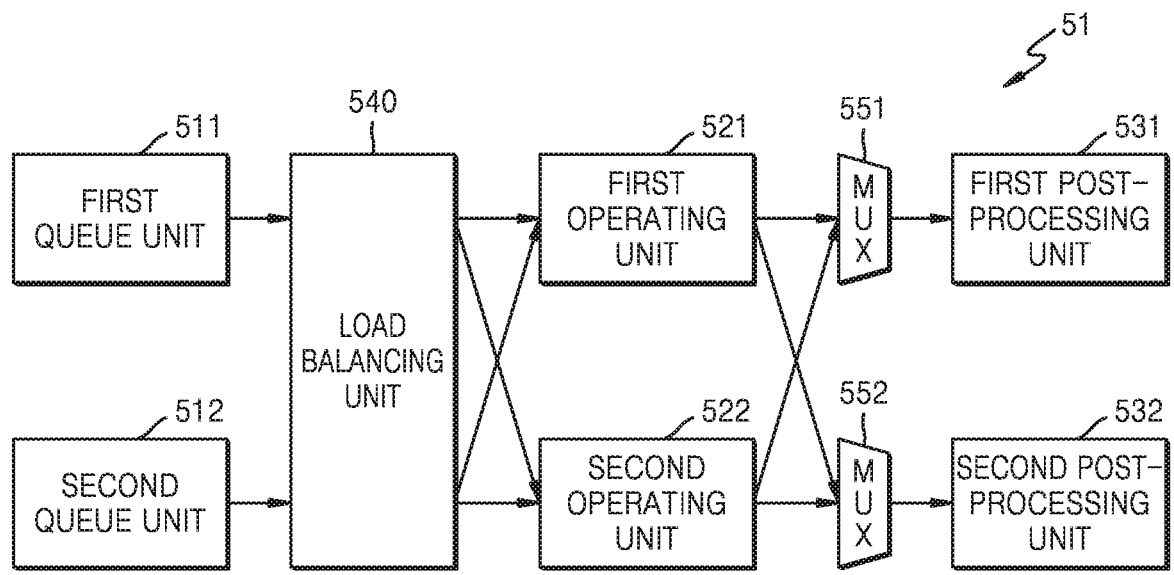
FIGS. 5A and 5B are diagrams illustrating examples of describing a load balancing unit and a connecting unit.
Figure 5B:
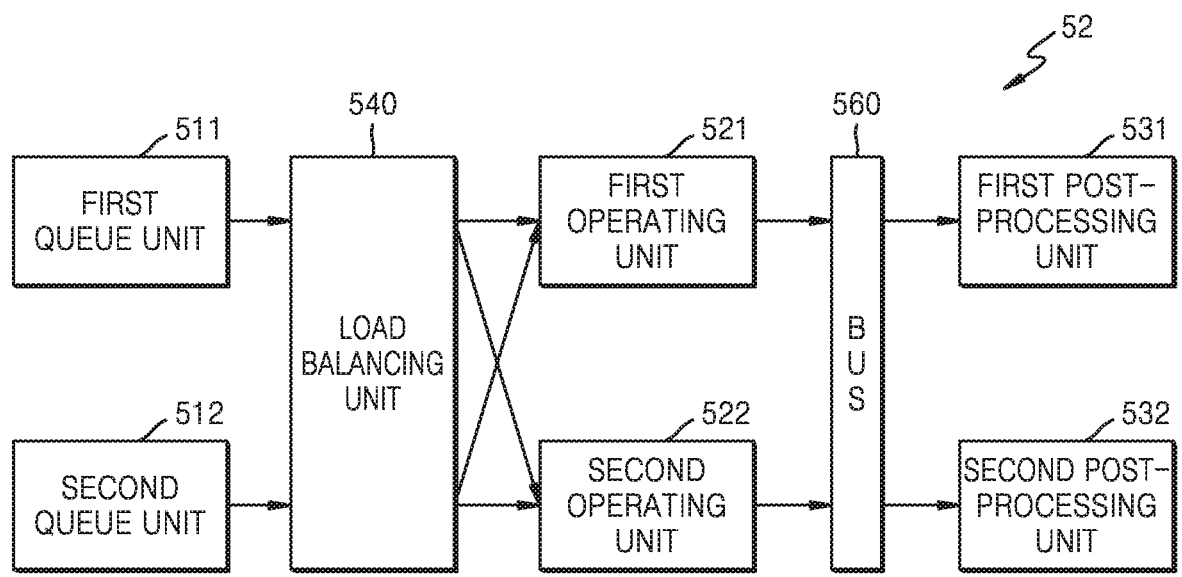

FIGS. 5A and 5B are diagrams illustrating examples for describing a load balancing unit and a connecting unit.

Referring to FIG. 5A, a neural network apparatus 51 may include a plurality of queue units 511 and 512 (i.e., a first queue unit 511 and a second queue unit 512), a plurality of operating units 521 and 522, a plurality of post-processing units 531 and 532, a load balancing unit 540 and a plurality of MUXs 551 and 552. Meanwhile, FIG. 5A shows a certain number of units, however, more or less units may be included in the neural network apparatus 51.

In an example, the queue units 511 and 512 may be connected to the operating units 521 and 522 by a fully-connected method. Referring to FIG. 5A, the load balancing unit 540 may connect the queue units 511 and 512 to the operating units 521 and 522.

The load balancing unit 540 may receive an input feature map, a kernel and tag information from the queue units 511 and 512, and transfer the input feature map, the kernel and the tag information to an operating unit that is in an idle state among the operating units 521 and 522.

For example, the load balancing unit 540 may receive an input feature map, a kernel and tag information from the first queue unit 511. In this case, when a first operating unit 521 is performing an operation and a second operating unit 522 has completed an operation, the load balancing unit 540 may transfer the input feature map, the kernel and the tag information received from the first queue unit 511 to the second operating unit 522.

In an example, the load balancing unit 540 may be an arbiter, although not limited thereto.

In an example, the operating units 521 and 522 may be connected to the post-processing units 531 and 532 by a 2:2 fully-connected method. Referring to FIG. 5A, the MUXs 551 and 552, which are connecting units, may connect the operating units 521 and 522 to the post-processing units 531 and 532.

The MUXs 551 and 552 may receive an intermediate feature map and tag information from the operating units 521 and 522. The MUXs 551 and 552 may determine a post-processing unit to which the intermediate feature map needs to be transferred, based on the tag information.

For example, the MUX 551 may receive an intermediate feature map and tag information from the second operating unit 522, wherein the tag information includes information about a position of the first post-processing unit 531. The MUX 551 may transfer the intermediate feature map to the first post-processing unit 531 based on the tag information including information about the position of the first post-processing unit 531.

Referring to FIG. 5B, a neural network apparatus 52 may include the queue units 511 and 512, the operating units 521 and 522, the post-processing units 531 and 532, the load balancing unit 540, and a bus 560. In addition to the description of FIG. 5B below, the descriptions of FIG. 5A are also applicable to FIG. 5B, and are incorporated herein by reference. Thus, the above description may be omitted for convenience of description.

Comparing FIG. 5B to FIG. 5A, the neural network apparatus 52 of FIG. 5B may use the bus 560 as a connecting unit, instead of the MUXs 551 and 552.

The BUS 560 may be 1:N (N is a natural number that is equal to or greater than 2) connected to the operating units 521 and 522 and the post-processing units 531 and 532. When the BUS 560 is used as a connecting unit, the degree of freedom of data movements may increase.

Figure 6:
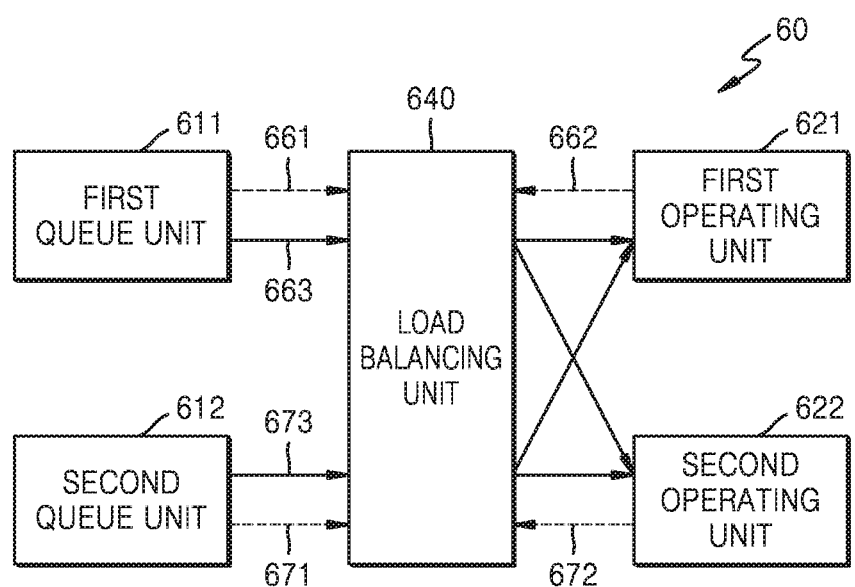
FIG. 6 is a diagram illustrating an example of an operation method of a load balancing apparatus.

FIG. 6 is a diagram illustrating an example of an operation method of a load balancing apparatus.

Referring to FIG. 6, a neural network apparatus 60 may include a plurality of queue units 611 and 612 (i.e., a first queue unit 611 and a second queue unit 612), a plurality of operating units 621 and 622 (i.e., a first operating unit 621 and a second operating unit 622) and a load balancing unit 640.

In an example, the queue units 611 and 612 may be connected to the operating units 621 and 622 by a fully-connected method. Referring to FIG. 6, the load balancing unit 640 may connect the queue units 611 and 612 to the operating units 621 and 622.

The load balancing unit 640 may receive an input feature map, a kernel and tag information from the queue units 611 and 612, and transfer the input feature map, the kernel and the tag information to an operating unit that is in an idle state from among the operating units 621 and 622.

In an example, the load balancing unit 640 may receive a signal 661 representing that there is a workload that is to be processed, from the first queue unit 611. The signal 661 may be a signal representing that there is data (an input feature map, a kernel, etc.) that has not yet been processed. Also, the load balancing unit 640 may receive signals 662 and 672 representing a current state of the first operating unit 621 and a current state of the second operating unit 622 from the first operating unit 621 and the second operating unit 622, respectively. In an example, the current states of the first operating unit 621 and the second operating unit 622 may be an operating state or an idle state.

After the load balancing unit 640 receives the signal 661 from the first queue unit 611, the load balancing unit 640 may determine which operating unit from among of the first operating unit 621 and the second operating unit 622 is in an idle state. The load balancing unit 640 transfers an input feature map, a kernel, and tag information received from the first queue unit 611 to the operating unit in the idle state based on the signals 662 and 672 received from the first operating unit 621 and the second operating unit 622, respectively.

For example, the signal 662 received from the first operating unit 621 may represent that the first operating unit 621 is operating, and the signal 672 received from the second operating unit 622 may represent that the second operating unit 622 is in an idle state. In this case, the load balancing unit 640 may transfer the input feature map, the kernel and the tag information received from the first queue unit 611 to the second operating unit 622.

Figure 7:
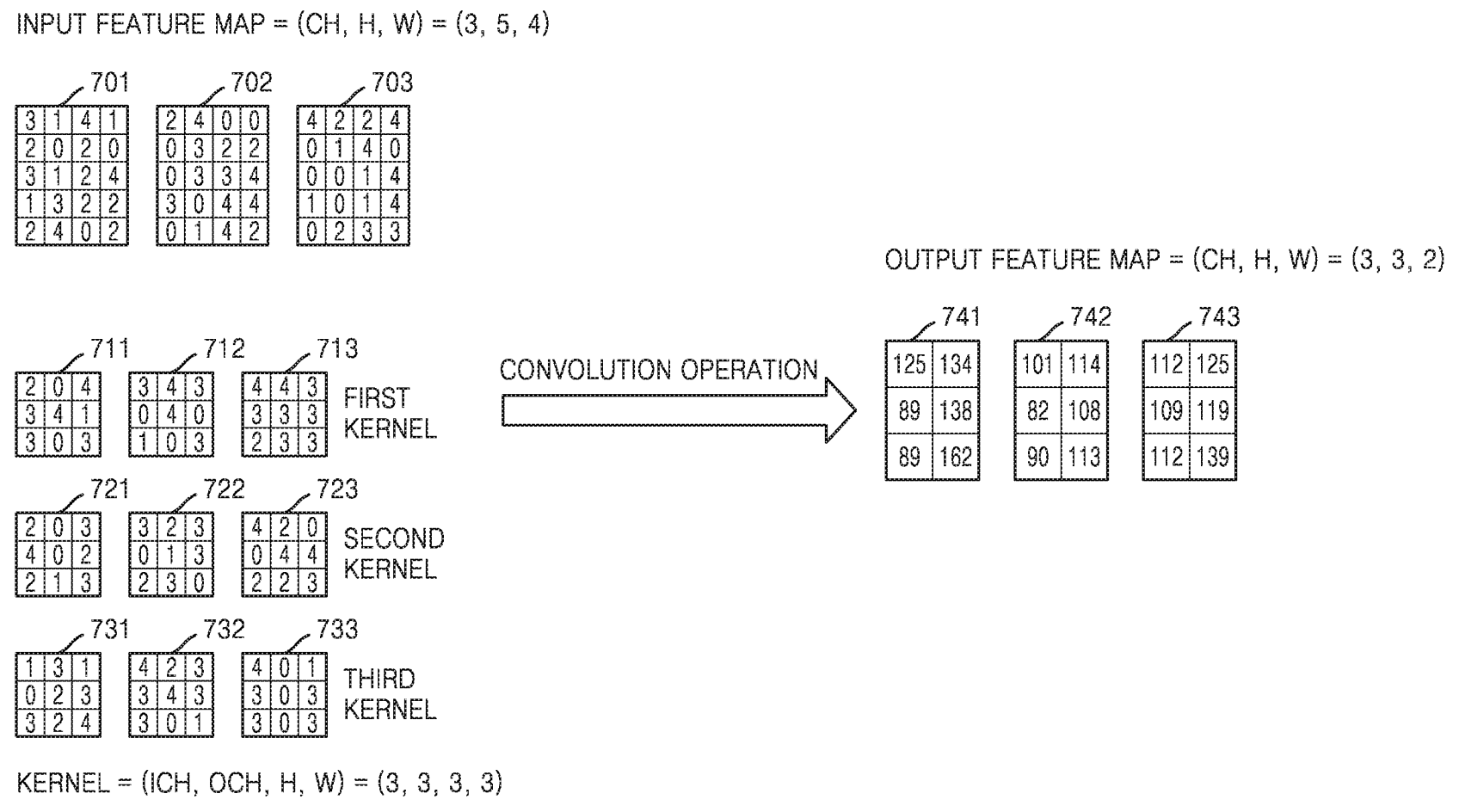

FIG. 7 is a diagram illustrating an example of creating output feature maps as the results of convolution operations between input feature maps and kernels.

In an example, the number of input feature maps 701 to 703 may be determined according to the number of input channels. For example, when input channels are RGB channels, the number of input feature maps 701 to 703 may be three. Referring to FIG. 7, the size of each of the input feature maps 701 to 703 may be 5×4. In an example, the input feature maps 701 to 703 shown in FIG. 7 may be sub input feature maps. For efficiency of operations, the input feature maps 701 to 703 may be a plurality of sub input feature maps split from all input feature maps.

Kernels may be divided into a first kernel set 711 to 713, a second kernel set 721 to 723, and a third kernel set 731 to 733. In an example, the number of kernels included in each kernel set may correspond to the number of input feature maps 701 to 703. Also, the respective kernel sets may include different kinds of kernels. For example, each kernel set may include any one of edge detection kernels, sharpen kernels, and Gaussian blur kernels. However, other kinds and number of the kernels are are considered to be well within the scope of the present disclosure.

Convolution operations between the input feature maps 701 to 703 and the first to third kernel sets 711 to 713, 721 to 723, and 731 to 733 may be performed to create a plurality of output feature maps 741 to 743.

When convolution operations between the input feature maps 701 to 703 and the first kernel set 711 to 713 are performed, a first output feature map 741 may be created. More specifically, a convolution operation between a first input feature map 701 and a 1-1 kernel 711 may be performed to create a first intermediate feature map (not shown), a convolution operation between a second input feature map 702 and a 1-2 kernel 712 may be performed to create a second intermediate feature map (not shown), and a convolution operation between a third input feature map 703 and a 1-3 kernel 713 may be performed to create a third intermediate feature map (not shown). An output feature map may be a sum of the first to third intermediate feature maps.

Likewise, convolution operations between the input feature maps 701 to 703 and the second kernel set 721 to 723 may be performed to create a second output feature map 742, and convolution operations between the input feature maps 701 to 703 and the third kernel set 731 to 733 may be performed to create a third output feature map 743.

In an example, the input feature maps 701 to 703 and the kernel set, which are used to create each of the output feature maps 741 to 743, may be included in an operation group. More specifically, the input feature maps 701 to 703 and the first kernel set 711 to 713 may be included in an operation group, and the input feature maps 701 to 703 and the second kernel set 721 to 723 and the input feature maps 701 to 703 and the third kernel set 731 to 733 may also be included in different operation groups.

Figure 8:
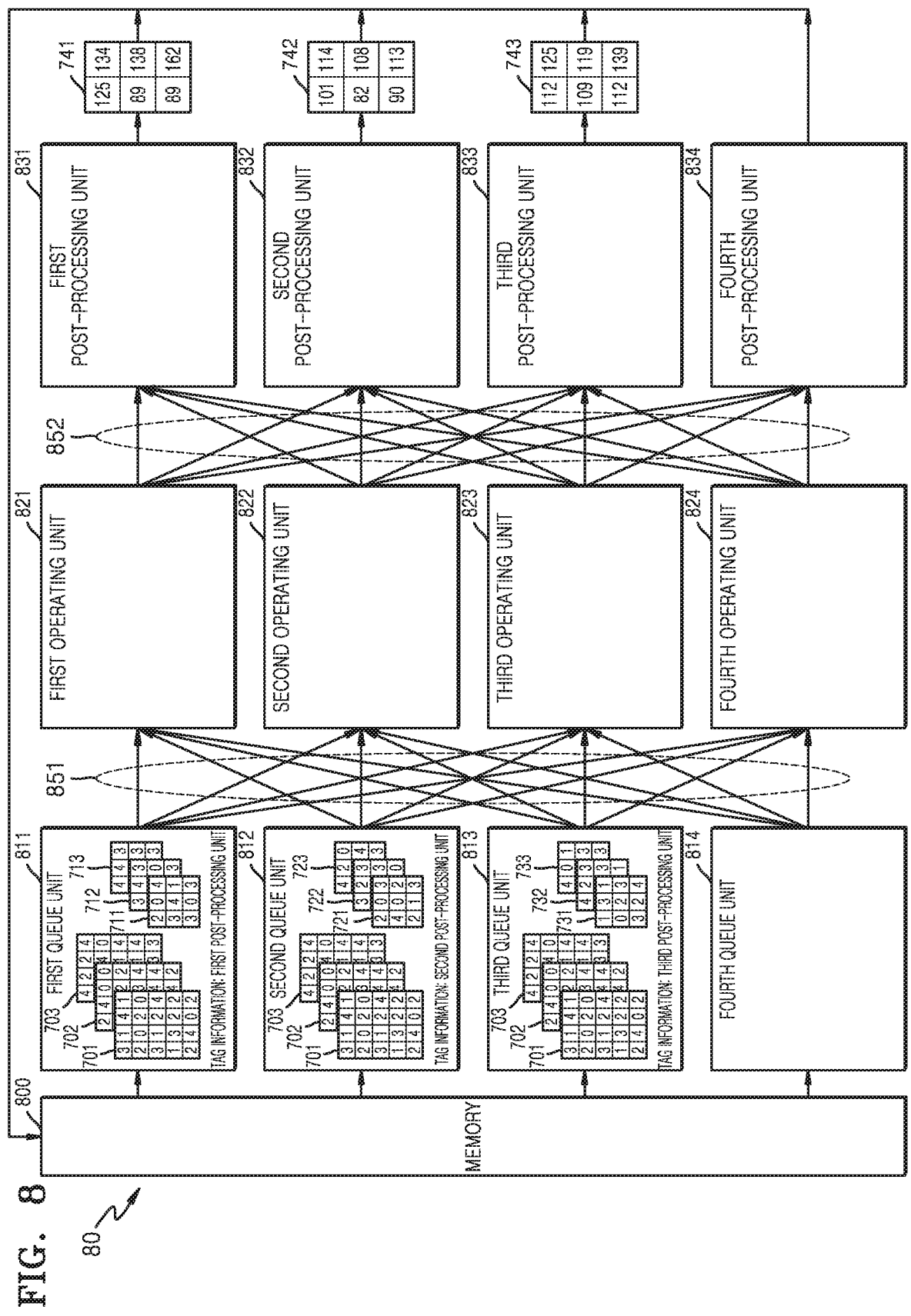
FIG. 8 is a diagram illustrating an example of a process in which convolution operations between the input feature maps and the kernels of FIG. 7 are performed in a neural network apparatus.

FIG. 8 is a diagram illustrating an example of a process in which convolution operations between the input feature maps and the kernels of FIG. 7 are performed in a neural network apparatus.

Referring to FIG. 8, a neural network apparatus 80 may include a memory 800, a plurality of queue units 811 to 814, a plurality of operating units 821 to 824, and a plurality of post-processing units 831 to 834.

In an example, each of the queue units 811 to 814 may be connected to the operating units 821 to 824 by a fully-connected method. A load balancing unit may be positioned between the queue units 811 to 814 and the operating units 821 to 824 to connect the queue units 811 to 814 to the operating units 821 to 824 by a fully-connected method 851. For example, the load balancing unit may be an arbiter, although not limited thereto.

In an example, each of the operating units 821 to 824 may be connected to the post-processing units 831 to 834 by a fully-connected method. A connecting unit may be positioned between the operating units 821 to 824 and the post-processing units 831 to 834 to connect the operating units 821 to 824 to the post-processing units 831 to 834 by a fully-connected method 852. For example, the connecting unit may be a MUX or a BUS, although not limited thereto.

In an example, a first queue unit 811 may receive a first operation group including the input feature maps 701 to 703 and the first kernel set 711 to 713 from the memory 800. In an example, a second queue unit 812 may receive a second operation group including the input feature maps 701 to 703 and the second kernel set 721 to 723 from the memory 800. In an example, the third queue unit 813 may receive a third operation group including the input feature maps 701 to 703 and the third kernel set 731 to 733 from the memory 800.

The operation groups received by the queue units 811 to 814 may be processed in the operating units 821 to 824 and the post-processing units 831 to 834 to create the output feature maps 741 to 743. The output feature maps 741 to 743 may be stored in the memory 800. The output feature maps 741 to 743 stored in the memory 800 may be used as input feature maps, or the neural network apparatus 80 may make one or more determinations based on the output feature maps 741 to 743.

Figure 9A:
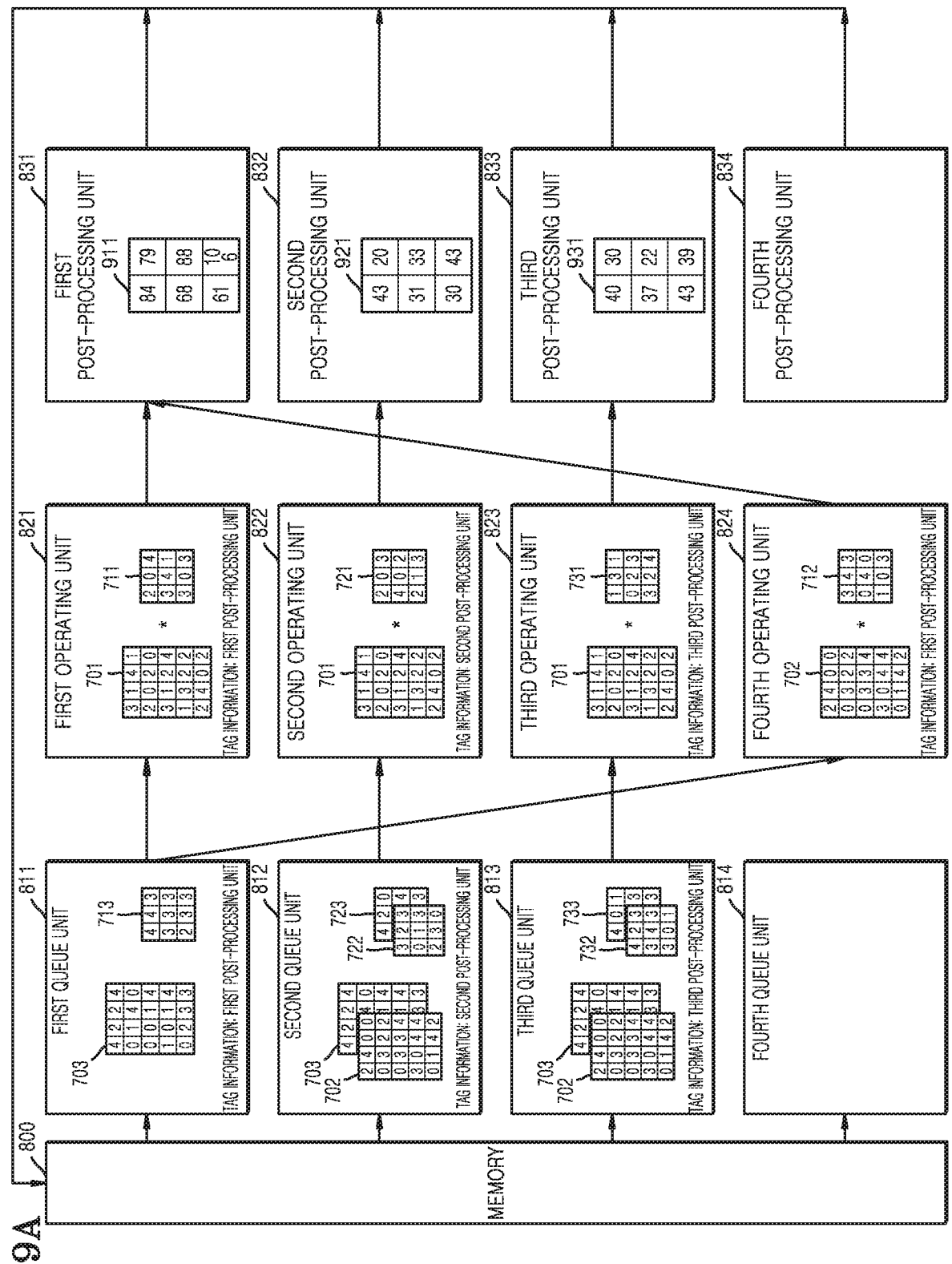
FIGS. 9A to 9C are diagrams illustrating examples for describing a process in which convolution operations between the input feature maps and the kernels of FIG. 7 are performed in a neural network apparatus.
Figure 9B:
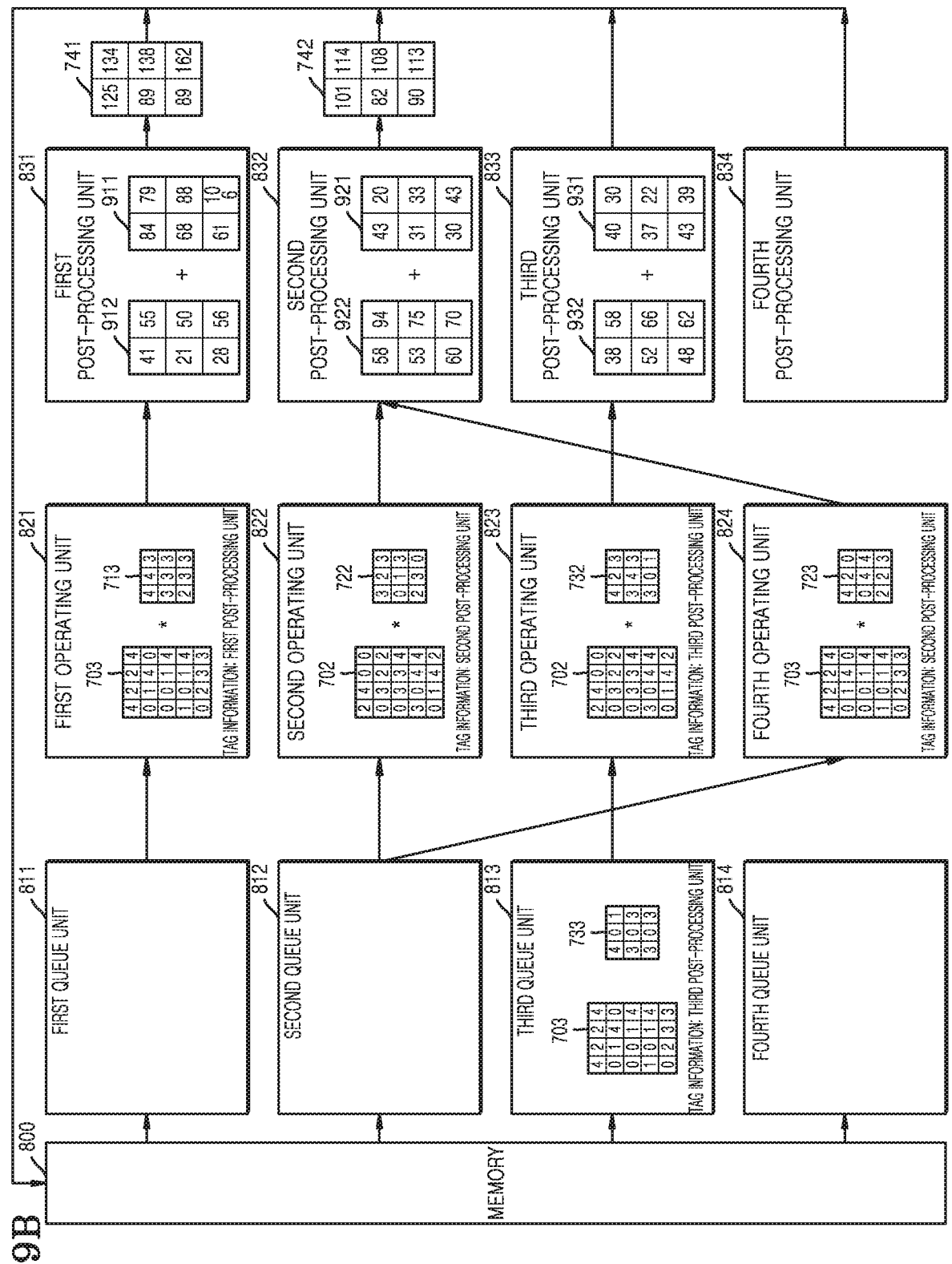
Figure 9C:
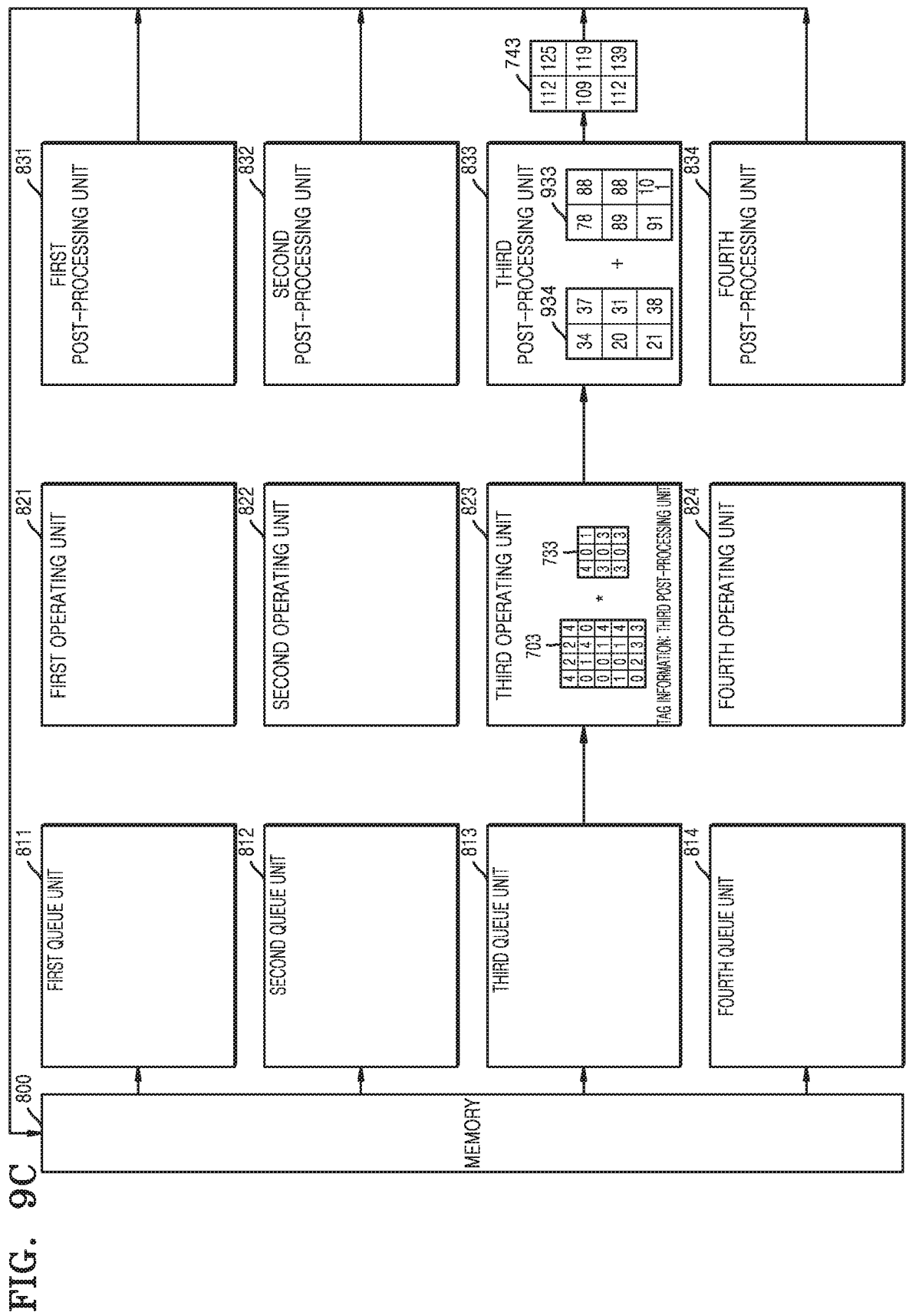

FIGS. 9A to 9C are diagrams illustrating examples of describing a process in which convolution operations between the input feature maps and the kernels of FIG. 7 are performed in a neural network apparatus.

In addition to the description of FIGS. 9A to 9C below, the descriptions of FIG. 8 are also applicable to FIGS. 9A to 9C, and are incorporated herein by reference. Thus, the above description may be omitted for convenience of description.

The queue units 811 to 814 may transfer an input feature map, a kernel and tag information to an operating unit that is in an idle state from among the operating units 821 to 824. The queue units 811 to 814, the operating units 821 to 824, and the post-processing units 831 to 834 of FIG. 9A may also be connected by a fully-connected method, like the corresponding ones of FIG. 8. Hereinafter, a path through which data is transferred will be described for convenience of description.

Referring to FIG. 9A, when all of the operating units 821 to 824 are in an idle state, the first queue unit 811 may transfer the first input feature map 701 and the 1-1 kernel 711 from among the input feature maps 701 to 703 and the first kernel set 711 to 713 included in the first operation group to the first operating unit 821. Also, the first queue unit 811 may transfer tag information including information about a position of the first post-processing unit 831 to the first operating unit 821, together with the first input feature map 701 and the 1-1 kernel 711.

The second queue unit 812 may transfer the first input feature map 701 and the 2-1 kernel 721 from among the input feature maps 701 to 703 and the second kernel set 721 to 723 included in the second operation group to the second operating unit 822. Also, the second queue unit 812 may transfer tag information including information about a position of the second post-processing unit 832 to the second operating unit 822, together with the first input feature map 701 and the 2-1 kernel 721.

The third queue unit 813 may transfer the first input feature map 701 and the 3-1 kernel 731 from among the input feature maps 701 to 703 and the third kernel set 731 to 733 included in the third operation group to the third operating unit 823. Also, the third queue unit 813 may transfer tag information including information about a position of the third post-processing unit 833 to the third operating unit 823, together with the first input feature map 701 and the 3-1 kernel 731.

Because the fourth operating unit 824 is in an idle state and the first queue unit 811 is connected to the fourth operating unit 824 by a fully-connected method, the first queue unit 811 may transfer the second input feature map 702 and the 1-2 kernel 712 from among the input feature maps 701 to 703 and the first kernel set 711 to 713 included in the first operation group to the fourth operating unit 824. In this case, the first queue unit 811 may transfer tag information including information about a position of the first post-processing unit 831 to the fourth operating unit 824, together with the second input feature map 702 and the 1-2 kernel 712. In another example, the second queue unit 812 or the third queue unit 813 in which a workload that is to be processed is included, instead of the first queue unit 811, and may transfer an input feature map, a kernel and tag information to the fourth operating unit 824.

In FIG. 9A, the queue units 811 to 814 may be directly connected to the operating units 821 to 824. However, in other example, the queue units 811 to 814 may be connected to the operating units 821 to 824 through a load balancing unit (not shown), such as, for example, an arbiter, by a fully-connected method.

In the operating units 821 to 824, convolution operations may be performed based on input feature maps and kernels received from the queue units 811 to 814. As the results of the convolution operations by the operating units 821 to 824, a plurality of intermediate feature maps may be created.

The first operating unit 821 may transfer an intermediate feature map 911 created as the result of a convolution operation between the first input feature map 701 and the 1-1 kernel 711 to the first post-processing unit 831, based on the tag information representing the information about the position of the first post-processing unit 831.

The second operating unit 822 may transfer an intermediate feature map 921 created as the result of a convolution operation between the first input feature map 701 and the 2-1 kernel 721 to the second post-processing unit 832, based on the tag information representing the information about the position of the second post-processing unit 832.

The third operating unit 823 may transfer an intermediate feature map 931 created as the result of a convolution operation between the first input feature map 701 and the 3-1 kernel 731 to the third post-processing unit 833, based on the tag information representing the information about the position of the third post-processing unit 833.

The fourth operating unit 824 receives tag information representing information about the position of the first post-processing unit 831 from the first queue unit 811, the fourth operating unit 824 may transfer an intermediate feature map created as the result of a convolution operation between the second input feature map 702 and the 1-2 kernel 712 to the first post-processing unit 831.

In FIG. 9A, the operating units 821 to 824 are directly connected to the post-processing units 831 to 834. However, as described above, the operating units 821 to 824 may be respectively connected to the post-processing units 831 to 834 through a connecting unit (not shown), such as, for example, a MUX and/or a BUS, by a fully-connected method.

The first post-processing unit 831 may receive the intermediate feature map created by the first operating unit 821 and the intermediate feature map created by the fourth operating unit 824, and calculate a partial sum of the intermediate feature maps to create an intermediate feature map 911. The post-processing units 831 to 834 may include an accumulator for performing a partial sum.

The first to third post-processing units 831 to 833 may reserve post-processing until receiving the results of convolution operations between input feature maps and kernels included in all operation groups.

Referring to FIG. 9B, after the operating units 821 to 824 complete convolution operations as described above with reference to FIG. 9A, the operating units 821 to 824 may again enter an idle state.

The first queue unit 811 may transfer the third input feature map 703 and the 1-3 kernel 713 to the first operating unit 821. Also, the first queue unit 811 may transfer tag information including information about the position of the first post-processing unit 831 to the first operating unit 821, together with the third input feature map 703 and the 1-3 kernel 713.

The second queue unit 812 may transfer the second input feature map 702 and the 2-2 kernel 722 to the second operating unit 822. Also, the second queue unit 812 may transfer tag information including information about the position of the second post-processing unit 832 to the second operating unit 822, together with the second input feature map 702 and the 2-2 kernel 722.

The third queue unit 813 may transfer the second input feature map 702 and the 3-2 kernel 732 to the third operating unit 823. Also, the third queue unit 813 may transfer tag information including information about the position of the third post-processing unit 833 to the third operating unit 823, together with the second input feature map 702 and the 3-2 kernel 732.

Because the fourth operating unit 824 is in an idle state, and the second queue unit 812 is connected to the fourth operating unit 824 by a fully-connected method, the second queue unit 812 may transfer the third input feature map 703 and the 2-3 kernel 723 to the fourth operating unit 824. In this case, the second queue unit 812 may transfer tag information including information about the position of the second post-processing unit 832 to the fourth operating unit 824, together with the third input feature map 703 and the 2-3 kernel 723.

The first operating unit 821 may transfer an intermediate feature map 911 created as the result of a convolution operation between the third input feature map 703 and the 1-3 kernel 713 to the first post-processing unit 831, based on tag information representing information about the position of the first post-processing unit 831.

The second operating unit 822 may transfer an intermediate feature map 921 created as the result of a convolution operation between the second input feature map 702 and the 2-2 kernel 722 to the second post-processing unit 832, based on tag information representing information about the position of the second post-processing unit 832.

The third operating unit 823 may transfer the intermediate feature map 931 created as the result of a convolution operation between the second input feature map 702 and the 3-2 kernel 732 to the third post-processing unit 833, based on tag information representing information about the position of the third post-processing unit 833.

Because the fourth operating unit 824 receives tag information representing information about the position of the second post-processing unit 832 from the second queue unit 812, the fourth operating unit 824 may transfer an intermediate feature map created as the result of a convolution operation between the third input feature map 703 and the 2-3 kernel 723 to the second post-processing unit 832.

The first post-processing unit 831 may calculate a partial sum of the pre-stored intermediate feature map 911 and the intermediate feature map 912 received from the first operating unit 821 to create the first output feature map 741.

The second post-processing unit 832 may receive the intermediate feature map created by the second operating unit 822 and the intermediate feature map created by the fourth operating unit 824, and calculate a partial sum of the intermediate feature maps to create an intermediate feature map 922. Also, the second post-processing unit 832 may calculate a partial sum of the pre-stored intermediate feature map 921 and the newly created intermediate feature map 922 to create the second output feature map 742.

The third post-processing unit 833 may calculate a partial sum of the pre-stored intermediate feature map 931 and an intermediate feature map 932 received from the third operating unit 823.

In an example, the first and second output feature maps 741 and 742 created by the first and second post-processing units 831 and 832 may be stored in the memory 800.

Referring to FIG. 9C, the third queue unit 813 may transfer the third input feature map 703 and the 3-3 kernel 733 to the third operating unit 823. Also, the third queue unit 813 may transfer tag information including information about the position of the third post-processing unit 833 to the third operating unit 823, together with the third input feature map 703 and the 3-3 kernel 733.

The third post-processing unit 833 may calculate a partial sum of a pre-stored intermediate feature map 933 and an intermediate feature map 934 received from the third operating unit 823 to create the third output feature map 743. The third output feature map 743 created by the third post-processing unit 833 may be stored in the memory 800.

Figure 10:
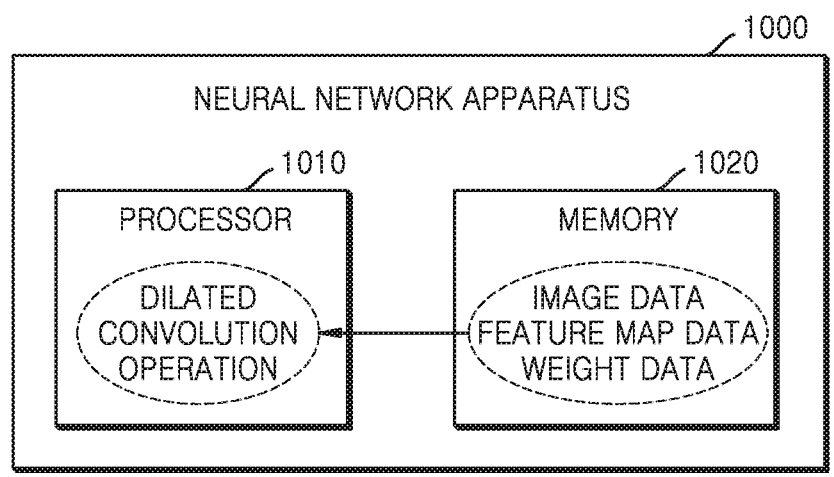
FIG. 10 is a diagram illustrating an example of a hardware configuration of a neural network apparatus.

FIG. 10 is a diagram illustrating an example of a hardware configuration of a neural network apparatus.

A neural network apparatus 1000 may be implemented as various kinds of devices, such as, for example, a server, a mobile device, a smart phone an embedded device, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, voice authentication systems, an Augmented Reality (AR) device, various Internet of Things (IoT) devices, robotics, medical equipment, which perform voice recognition, image recognition, image classification, through a neural network, although not limited thereto. The examples described herein may be applicable to vehicles and vehicle management systems such as, for example, an autonomous vehicle, an automatic or autonomous driving system, an intelligent vehicle, an advanced driver assistance system (ADAS), a navigation system to assist a vehicle with safely maintaining a lane on which the vehicle is travelling. The examples described herein may be used for road guidance information in a navigation device of a vehicle, such as, for example, an augmented reality head-up display (AR 3D HUD). Furthermore, the neural network apparatus 1000 may be a dedicated hardware accelerator mounted in the above-mentioned devices, and the neural network apparatus 1000 may be a hardware accelerator, such as, for example, a neural processing unit (NPU), a tensor processing unit (TPU), a neural engine, which is a dedicated module for driving a neural network, although not limited thereto. The examples described above are non-limiting, and other examples such as, for example, training, gaming, applications in healthcare, public safety, tourism, and marketing are considered to be well within the scope of the present disclosure.

Referring to FIG. 10, the neural network apparatus 1000 may include a processor 1010, a memory 1020, and a user interface or a display (not shown). In the neural network apparatus 1000 shown in FIG. 10, components related to the current embodiments are shown. The neural network apparatus 1000 may further include other general-purpose components, in addition to the components shown in FIG. 10.

The processor 1010 may control all functions for executing the neural network apparatus 1000. For example, the processor 1010 may execute programs stored in the memory 1020 of the neural network apparatus 1000 to thereby control all operations of the neural network apparatus 1000. The processor 1010 refers to a data processing device configured as hardware with a circuitry in a physical structure to execute desired operations. For example, the desired operations may include codes or instructions included in a program. For example, the processor 1010 may be the data processing device configured as hardware may include a microprocessor, a central processing unit (CPU), a processor core, a multicore processor, a multiprocessor, an application-specific integrated circuit (ASIC), and a field programmable gate array (FPGA), a GPU, and an AP included in the neural network apparatus 1000, although not limited thereto. In addition to the description of processor 1010, the processor 1010 has also been described in FIG. 3, which description is also applicable to processor 1010, and are incorporated herein by reference. Thus, the above description may be omitted for convenience of description.

The memory 1020 may be hardware storing various data processed in the neural network apparatus 1000, and for example, the memory 1020 may store data processed in the neural network apparatus 1000 and data that is to be processed in the neural network apparatus 1000. Also, the memory 1020 may store applications, drivers, etc. that are to be driven by the neural network apparatus 1000. The memory 1020 may include RAM (for example, DRAM or SRAM), ROM, EEPROM, CD-ROM, Blue-ray or another optical disk storage, HDD, SSD, or a flash memory. In addition to the description of memory 1020, the memory 1020 has also been described in FIG. 3, which description is also applicable to memory 1020, and are incorporated herein by reference. Thus, the above description may be omitted for convenience of description.

The user interface is a physical structure that includes one or more hardware components that provide the ability to render a user interface, render a display, outputs information, and/or receive user input. The user interface outputs the result that it receives from the neural network apparatus 1000. However, the user interface is not limited to the example described above, and in an example, any displays, such as, for example, computer monitor and eye glass display (EGD) that are operatively connected to the apparatus 1000 may be used without departing from the spirit and scope of the illustrative examples described.

The processor 1010 may read/write neural network data, for example, image data, feature map data, weight data, etc., from/in the memory 1020, and execute the neural network using the read/written data. When the neural network is executed, the processor 1010 may repeatedly perform convolution operations between an input feature map and weights to create data for an output feature map. At this time, an operation count of the convolution operations may be determined depending on various factors, such as the number of channels of the input feature map, the number of channels of the weights, a size of the input feature map, a size of the weights, precisions of values, etc. Unlike the neural network 1 shown in FIG. 1, an actual neural network that is driven on the neural network apparatus 1000 may be implemented with a more complicated architecture. Accordingly, the processor 1010 may perform convolution operations by a great operation count that may reach hundreds of millions to tens of billions of convolution operations, so that the frequency of access to the memory 1020 by the processor 1010 for the convolution operations may also increase rapidly.

Meanwhile, in the neural network, weights may be floating point-type weights, fixed point-type weights, binary weights, or ternary weights. That is, in the neural network, the weights may be defined variously considering various factors, such as the purpose of use of the neural network, device performance, etc.

Figure 11:
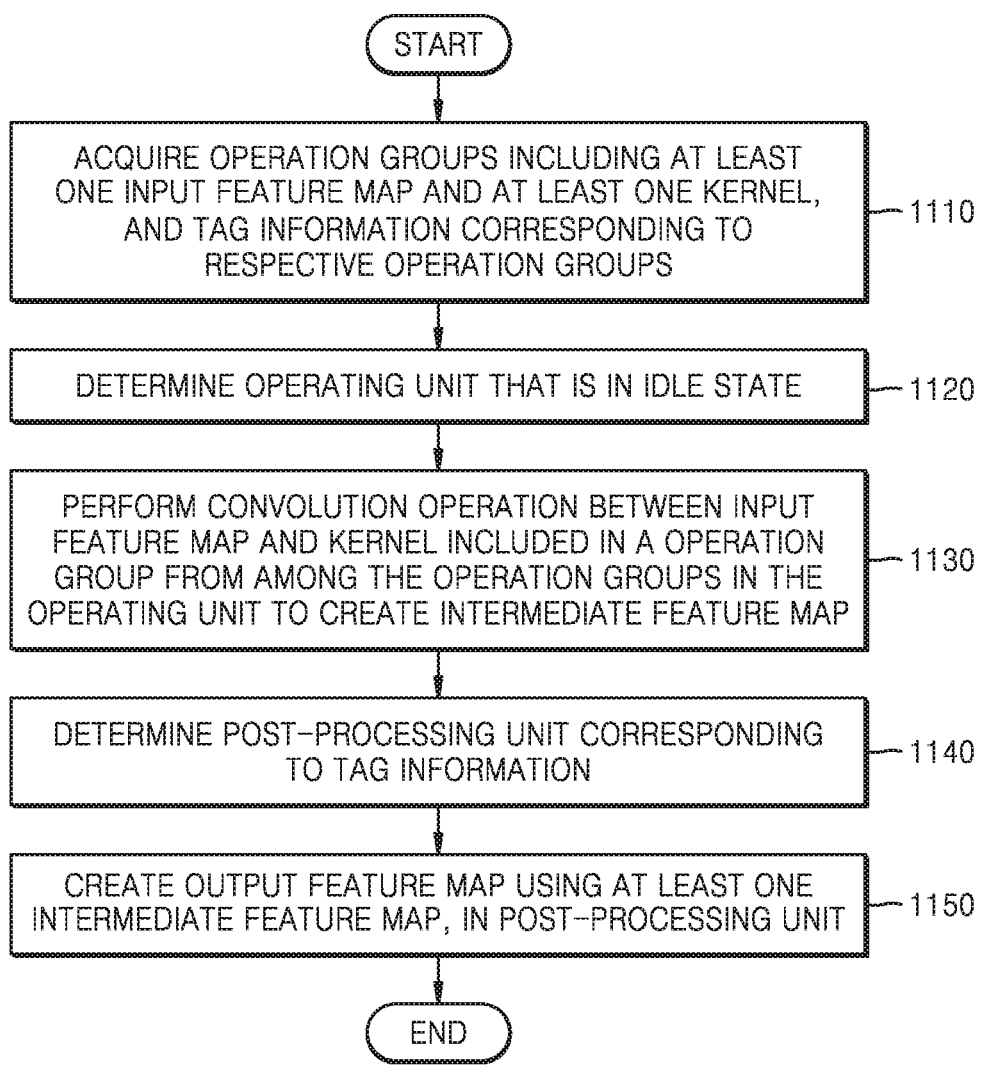
FIG. 11 is a diagram illustrating an example of a method of performing convolution operations in a neural network apparatus.

FIG. 11 is a diagram illustrating an example of a method of performing convolution operations in a neural network apparatus. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer, such as a processor, that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

Referring to FIG. 11, in operation 1110, a neural network apparatus may acquire a plurality of operation groups each including at least one input feature map and at least one kernel, and tag information corresponding to the respective operation groups.

The neural network apparatus may acquire at least one input feature map and at least one kernel from a memory or from the outside.

Each operation group may include at least one input feature map and at least one kernel that are used to create an output feature map. The tag information may include information about a position of a post-processing unit to which an intermediate feature map that results from an operation between the input feature map and the kernel needs to be transferred.

In an example, the neural network apparatus may include a plurality of queue units, and each of the queue units may acquire (or receive) a operation group and tag information corresponding to the operation group from the memory.

In an example, the neural network apparatus may determine an operating unit that is in an idle state among the operating units, in operation 1120.

When an operating unit is performing an operation, the operating unit may be in an operating state, and when the operating unit is performing no operation, the operation unit may be in an idle state.

In an example, the neural network apparatus may include a load balancing unit. The load balancing unit may connect at least some of the queue units to at least one of the operating units by a fully-connected method.

The load balancing unit may receive a signal representing that there is a workload that is to be processed, from the queue units, and a signal representing that an operating unit is in an idle state, from the operating unit, and match the queue units with the operating unit that is in an idle state. Thereafter, the load balancing unit may transfer an input feature map, a kernel and tag information received from each of the queue units to the operating unit that is in the idle state.

In an example, the load balancing unit may be an arbiter, although not limited thereto.

In operation 1130, the neural network apparatus may perform a convolution operation between an input feature map and a kernel included in the operation group from among the operation groups in the operating unit that is in the idle state, thereby creating an intermediate feature map. The operating unit may be a multiply and accumulate (MAC) unit.

In operation 1140, the neural network apparatus may determine, based on tag information corresponding to the operation group, a post-processing unit corresponding to the tag information from among the post-processing units.

In an example, the neural network apparatus may include a connecting unit. The connecting unit may connect at least some of the operating units to at least some of the post-processing units by a fully-connected method.

The connecting unit may be at least one of a multiplexer or a bus.

In operation 1150, the neural network apparatus may create an output feature map by using at least one intermediate feature map, in the post-processing unit.

In an example, the post-processing unit may calculate a partial sum of a plurality of intermediate feature maps. Also, the post-processing unit may create an output feature map by performing at least one of pooling or an activation function operation by using the at least one intermediate feature map.

According to the embodiments of the disclosure, by performing dilated convolutions using hardware including a splitter, a convolution operator, and a merger, computing speed and power efficiency may be improved.

The neural network apparatus 3, neural network apparatus 4, neural network apparatus 51, queue units 511 and 512, operating units 521 and 522, post-processing units 531 and 532, load balancing unit 540, MUXs 551 and 552, neural network apparatus 60, queue units 611 and 612, operating units 621 and 622, load balancing unit 640, neural network apparatus 80, queue units 811 to 814, operating units 821 to 824, post-processing units 831 to 834, neural network apparatus 1000 and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of performing an operation in a neural network apparatus. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing a recognition operation in a neural network apparatus having a plurality of queue units, a plurality of operating circuits, a plurality of post-processing circuits and a load balancing circuit, wherein some queue units of the plurality of queue units are connected in a fully-connected configuration to corresponding operating circuits from among the plurality of operating circuits, and remaining queue units of the plurality of queue units are connected to only one respective operating circuit, the method comprising:
acquiring, at a first queue unit of the plurality of queue units that is fully-connected and from layers of a neural network, an operation group related to an image comprising:
at least one input feature map and at least one kernel, where a convolution operation between one input feature map of the at least one feature map and one kernel of the at least one kernel creates an intermediate feature map; and
tag information, corresponding to the operation group, including a position of a post-processing circuit, from among the plurality of post-processing circuits, to which the intermediate feature map is to be transferred;
determining, by the load balancing circuit from among corresponding operation circuits that are connected to the first queue unit, an operating circuit in an idle state, wherein determining further comprises:
receiving a signal from the first queue unit indicating that a workload is to be processed, and a signal from the operating circuit in the idle state indicating that the opearting circuit is in the idle state,
matching the first queue unit with the operating circuit in the idle state, and transferring the at least one input feature map, the at least one kernel, and the tag information from the first queue unit to the operating circuit in the idle state;
creating, by operating circuit in the idle state, the intermediate feature map from the convolution operation between the one input feature map and the one kernel; and
creating, at the post-processing circuit determined based on the tag information included in the operation group received from the layers of the neural network, an output feature map using the intermediate feature map; and
outputting recognition results of features of the image at least in part on the output feature map.

2. The method of claim 1, wherein the plurality of operating circuits are connected to the plurality of post-processing circuits by a connection, and
receiving, at a connection, the intermediate feature map and tag information from the operating circuit; and
transferring, at the connection, the intermediate feature map to the post-processing circuit based on the tag information.

3. The method of claim 1, wherein the creating of the output feature map comprises determining, at the post-processing unit, a partial sum of the intermediate feature map to create the output feature map.

4. The method of claim 1, wherein the creating of the output feature map includes performing, by the post-processing circuit, at least one of pooling or an activation function operation, after the use of the intermediat feature map by the post-processing circuit, to create the output feature map.

5. The method of claim 1, wherein each of the plurality of operating circuits comprise a multiphy and accumulate (MAC) unit.

6. The method of claim 1, wherein the load balancing circuit comprises an arbiter.

7. The method of claim 2, wherein the connection comprises at least one of a multiplexer or a bus.

8. The method of claim 1, wherein some operating circuits of the plurality of operating circuits are connected to each of some post-processing circuits of the plurality of post-processing circuits in a corresponding fully-connected configuration.

9. The method of claim 1, wherein the first queue unit is connected to a first corresponding operating circuit and second corresponding operating circuit, and wherein a second queue unit of the plurality of queue units is connected to only the first corresponding operating circuit.

10. The method of implementing a neural network in a neural network apparatus having a plurality of queue units, a plurality of convolution nodes and a plurality of post-processing nodes, wherein some queue units are connected in a fully-connected configuration to some convolution nodes, and the some convolution nodes are connected in a corresponding fully-connected configuration to some post-processing nodes, and remaining queue units are connected to only one corresponding convolution node and the remaining convolution nodes are connected to only one post-processing node, the method comprising:
acquiring a plurality of operation groups related to an image, with each operation group including at least one input feature map, at least one kernel, and at least one tag information identifying a position of a corresponding post-processing node among a plurality of post-processing nodes of the neural network; and
for each of the plurality of operation groups;
determining one convolution node in an idle state form amoung a plurality of convolution nodes of the neural network based on receiving a signal from one queue unit indicating that a workload is to be processed, and a signal from the one convolution node in the idle state indicating that the convolution node is in the idle state;
matching the one queue unit with the one convolution node in the idle state;
transferring from the one queue unit, one opeartion group from among the plurality of operation groups, to the one convolution node in the idle state;
performing, at the one convolution node in the idle state, a convolution operation between an input feature map and a kernel included of the one operation group to create an intermediate feature map;
determining, from tag information of the one operation group, a post-processing node, from among the plurailty of post-processing nodes; and creating, at the post-processing node determined based on the tag information included in the one operation group received from the neural network, an output feature map from the intermediate feature map; and outputting recognition results of features of the image based on the output feature map for each of the plurality of operation groups.

11. A non-transitory computer-readable storage medium storing instructions that, when executed by a processor, cause the processor to perform a recognition operation in a neural network apparatus having a plurality of queue units, a plurality of operating circuits, a plurality of post-processing circuits and a load balancing circuit, wherein only some queue units of the plurality of queue units are connected in a fully-connected configuration to the corresponding operating circuits from among a plurality of opearting circuits, and remaining queue units of the plurality of queue units are connected to only one respective operating circuit comprising:

acquiring, at a first queue unit of the plurality of queue units that is fully-connected, an operation group related to an image comprising:
  at least one input feature map and at least one kernel, where a convolution operation between one input feature map of the at least one input feature map and one kernel of the at least one kernel creates an intermediate feature map; and
  tag information, corresponding to the operation group, including a position of a post-processing circuit, from among the plurality of post-processing circuits, to which the intermediate feature map is to be transferred;

determining, by the load balancing circuit from among corresponding operation circuits that are connected to the first queue unit, an operating circuit in an idle state, wherein determining further comprises:
  receiving a signal from the first queue unit indicating that a workload is to be processed, and a signal from the operating circuit in the idle state indicating that the operating circuit is in the idle state,
  matching the first queue unit with the operating circuit in the idle state, and
  transferring the at least one input feature map, the at least one kernel, and the tag information from the first queue unit to the operating circuit in the idle state;

creating, by the operating circuit in the idle state, the intermediate feature map from the convolution operation between the one input feature map and the one kernel; and creating, by the post-processing circuit determined based on the tag information included in the operation group received from layers of a neural network an output feature map using the intermediate feature map; and outputting recognition results of features of the image at least in part one the output feature map.

12. A neural network apparatus for performing a recognition operation, the neural network apparatus having a plurality of queue units, a plurality of operating circuits, a plurality of post-processing circuits and a load balancing circuit, wherein some queue units of the plurality of queue units are connected in a fully-connected configuration to corresponding operating circuits from among a plurality of operating circuits, and remaining queue units of the plurality of queue units are connected to only one respective operating circuits, comprising:

a processor configured to
acquire, at a first queue unit of the plurality of queue units that is fully-connected, an operation group related to an image comprising:
  at least one input feature map and at least one kernal, where a convolution operation between one input feature map of the at least one input feature map and one kernel of the at least one kernel creates an intermediate feature map; and
  tag information, corresponding to the operation group, including a position of a post-processing circuit, from among the plurality of post-processing circuits, to which the intermediate feature map is to be transferred;

control the load balancing circuit to determine from among corresponding operation circuits that are connected to the first queue unit, an operating circuit in an idle state, wherein to determine, the processor is further configured to control the load balancing circuit to:
  receive a signal from the first queue unit indicating that a workload is to be processed, and a signal from the operating circuit in the idle state indicating that the operating circuit is in the idle state, and
  match the first queue unit with the operating circuit in the idle state, and
  control the first queue unit to transfer the one input feature map, the one kernel, and the tag information to the operating circuit in the idle state;

control the operating circuit in the idle state to create the intermediate feature map from the convolution operation between the one input feature map and the one kernel; and control the post-processing circuit, determined based on the tag information included in the operation group received from layers of a neural network, to create an output feature map using the intermediate feature map; and output recognition results of features of the image at least in part on the output feature map.

13. The neural network apparatus of claim 12, wherein the plurality of operating circuits are connected to the plurality of post-processing circuits by a connection, and
  the processor is further configured to control the connecting unit to receive the intermediate feature map and tag information mapped to the operation group from the operating circuit, and to transfer the intermediate feature map to the post-processing unit based on the tag information.

14. The neural network apparatus of claim 12, wherein the processor is further configured to control the post-processing unit to determine a partial sum of the intermediate feature map to create the output feature map.

15. The neural network apparatus of claim 12, wherein the processor is further configured to control the post-processing circuit to perform at least one of pooling or an activation function operation, after the use of the intermediate feature map by the post-processing circuit, to create the output feature map.

16. The neural network apparatus of claim 12, wherein some operating circuits of the plurality of operating circuits are connected to each of some post-processing circuits of the plurality of the post-processing circuits in a corresponding fully-connected configuration.

17. The neural network apparatus of claim 12, wherein each of the plurality of operating comprise a multiply and accumulate (MAC) unit.

18. The neural network apparatus of claim 12, wherein the load balancing circuit comprises an arbiter.

19. The neural network apparatus of claim 13, wherein the connection comprises at least one of a multiplexer or a bus.

20. The apparatus of claim 12, further comprising a memory storing instructions that, when executed, configures the processor to acquire the operation groups, to determine the whether the operating circuit is in the idle state, to control the operating circuit in the idle state, to determine the post-processing circuit, and to control the post-processing circuit to create the output feature map.

* * * * *